United States Patent [19]
Maruoka et al.

[11] Patent Number: 6,096,851
[45] Date of Patent: Aug. 1, 2000

[54] COATING MATERIAL FOR GOLF BALL AND GOLF BALL COATED WITH THE SAME

[75] Inventors: Kiyoto Maruoka; Katsumi Terakawa, both of Kobe, Japan

[73] Assignee: Sumitomo Rubber Industries Limited, Kobe, Japan

[21] Appl. No.: 09/119,638

[22] Filed: Jul. 21, 1998

[30] Foreign Application Priority Data

Sep. 12, 1997 [JP] Japan .................................... 9-248807
Jun. 1, 1998 [JP] Japan ................................... 10-151681

[51] Int. Cl.$^7$ .................................................. C08G 18/10
[52] U.S. Cl. ............................ 528/85; 473/377; 473/378
[58] Field of Search .............................. 528/85; 473/377, 473/378

[56] References Cited

U.S. PATENT DOCUMENTS 5,221,788 6/1993 Goto .......................................... 528/85

FOREIGN PATENT DOCUMENTS 8-182775 7/1996 Japan .
9-59566 3/1997 Japan .

*Primary Examiner*—Rachel Gorr
*Attorney, Agent, or Firm*—Birch, Stewart, Kolasch & Birch, LLP

[57] ABSTRACT

The present invention provides a coating material for golf ball. The coating material comprises: polyol containing urethane polyol as a chief material; and polyisocyanate as a curing agent. An equivalent ratio of isocyanate groups of the polyisocyanate with respect to hydroxyl groups of the polyol is 0.5 to 2.0. The urethane polyol has a hydroxyl value of 55 to 130 mgKOH/g, and weight-average molecular weight of 4000 to 9000.

6 Claims, No Drawings

COATING MATERIAL FOR GOLF BALL AND GOLF BALL COATED WITH THE SAME

FIELD OF THE INVENTION

The present invention relates to a coating material for golf ball which forms a coating layer excellent in resistance to impact and scuffing in both dry and wet conditions, and is dryable in a short time with high productivity; and a golf ball coated with the coating material.

BACKGROUND OF THE INVENTION

A coating layer formed around a golf ball main body is required to satisfy the following requirements: 1) the coating layer has high impact resistance (i.e., peeling resistance) so that it adapts to the deformation of the golf ball main body (i.e., the part of the golf ball other than the coating layer) when the golf ball is hit; and 2) the coating layer has high resistance to scuffing so that it is hard to get scuffed or cracked even when it is hit with a metal head like a short iron and receives high impact and friction. In general, when a golf ball is hit, it deforms 30 percent or more in its diameter. Therefore, if the coating layer has poor adhesion to the golf ball main body, or has excessively high hardness with poor elasticity, a problem arises that the coating layer does not adapt to the deformation of the golf ball main body, and peels off. On the other hand, if the coating layer is too soft, a problem arises that the coating layer easily gets scuffed or cracked. In addition, the coating layer is required to satisfy the above-described requirements not only in a dry condition but also in a wet condition, because a golf ball frequently gets wet with water during a golf play. When a golf ball gets wet, foams are generated in the coating layer or in an interface between the coating layer and the golf ball main body. The foams cause the decrease in the hardness of the coating layer, or the deterioration of the adhesion between the coating layer and the golf ball main body.

In order to form a coating layer excellent in resistance to impact and scuffing, conventionally used is a two-part urethane-based coating material produced by mixing polyol as a chief material and polyisocyanate as a curing agent. Thus-obtained coating material is applied to an outside surface of a golf ball main body, and then is baked to promote a curing reaction.

In general, a golf ball main body includes a core and a cover. A cover is generally produced using an ionomer resin. When an ionomer resin is heated to high temperature, the ionic bond of the ionomer resin is weakened. Therefore, if the coating material applied to the golf ball main body is dried at high temperature, there is a likelihood that the elasticity and the hardness of the cover made of the ionomer resin are deteriorated. As one of the methods to solve this problem, it is considered to dry the coating material at low temperature. However, at low temperature, the curing reaction proceeds slowly, and it takes long time to dry the coating material. This results in low productivity. For example, Japanese Unexamined Patent Publication No. 8-182775 discloses an urethane-based coating material produced by mixing polyol and polyisocyanate. In this prior art, in an attempt to improve adhesion between the coating layer and the cover of the golf ball, polyol and polyisocyanate are mixed with each other in such a manner that the amount of hydroxyl groups of polyol is excessive with respect to the amount of the isocyanate groups of polyisocyanate by molar ratio. However, the urethane-based coating material has a problem that it requires long drying time, specifically 24 hours or longer, at 40 to 50° C. This results in low productivity. Under such situations, developments are being made in an urethane-based coating material which is dryable in a short time.

Recently, there has been developed an urethane-based coating material which is dryable in a short time. In the urethane-based coating material, a part of polyol has been already reacted with polyisocyanate to form prepolymer (hereinafter, referred to as urethane polyol).

For example, Japanese Unexamined Patent Publication No. 9-59566 discloses a coating material for golf ball including urethane polyol. The urethane polyol has weight-average molecular weight of 10000 to 50000, and has urethane bonds as main chains and hydroxyl groups as terminal groups. In the coating material, a part of hydroxyl groups of the polyol has been already reacted with isocyanate groups to form urethane. Thus-obtained coating material is dryable in a short time with high productivity. However, the presence of the urethane polyol results in poor adhesion of the coating material to the outside surface of the golf ball main body. This is because this coating material has the smaller amount of free hydroxyl groups and free isocyanate groups than the ordinary urethane-based coating material, and therefore, does not sufficiently react with the outside surface of the golf ball main body. The problem of poor adhesion is remarkable when the coating material is applied to a golf ball main body in a one-piece structure having a rubber core but no ionomer cover, because this coating material is intended to be applied to a cover. In addition, there is another problem that, when the coating material is applied to a one-piece golf ball and is dried at high temperature, the physical properties of the rubber core is deteriorated. In order to solve these problems, there are demands for developing a coating material which is dryable in a short time at relatively low temperature.

SUMMARY OF THE INVENTION

An objective of the present invention is to provide a coating material for golf ball which is dryable in a short time at relatively low temperature and forms a coating layer keeping good adhesion to a golf ball main body in both dry and wet conditions; and a golf ball coated with the same.

According to an aspect of the invention, a coating material for golf ball includes: polyol containing urethane polyol as a chief material; and polyisocyanate as a curing agent. An equivalent ratio of isocyanate groups of the polyisocyanate with respect to hydroxyl groups of the polyol is 0.5 to 2.0. The urethane polyol has a hydroxyl value of 15 to 130 mgKOH/g, and weight-average molecular weight of 4000 to less than 10000.

According to another aspect of the invention, a golf ball includes a main body and a coating layer formed on an outside surface of the main body. The coating layer includes: polyol having urethane polyol as a chief material; and polyisocyanate as a curing agent. An equivalent ratio of isocyanate groups of polyisocyanate with respect to hydroxyl groups of polyol is 0.5 to 2.0. The urethane polyol has a hydroxyl valence of 15 to 130 mgKOH/g, and weight-average molecular weight of 4000 or higher to less than 10000.

DETAILED DESCRIPTION OF THE PREFERRED EMBODIMENTS OF THE INVENTION

A coating material for golf ball according to the present invention is a two-part urethane-based coating material including a chief material and a curing agent. First, the chief material will be described.

The chief material includes polyol as a main component. Polyol contains urethane polyol described below.

The urethane polyol is synthesized by reaction between polyisocyanate and polyol. The polyisocyanate is not specifically limited as far as it has two or more isocyanate groups. Examples of the polyisocyanate include aliphatic, alicyclic, and aromatic diisocyanate compounds (i.e., aromatic diisocyanate compounds with or without isocyanate on their side chains) such as hexamethylene diisocyanate (HDI), xylylene diisocyanate (XDI), hydrogenated xylylene diisocyanate ($H_6XDI$), isophorone diisocyanate (IPDI), tetramethyl xylylene diisocyanate (TMXDI), and hydrogenated diphenylmethane diisocyanate ($H_{12}MDI$). Especially preferable is non-yellowing polyisocyanate (i.e., aliphatic or alicyclic polyisocyanate), because it exhibits high weather resistance.

Polyol used for producing the urethane polyol is not specifically limited, and may be selected from low-molecular weight polyol and high-molecular weight polyol as far as it has a plurality of hydroxyl groups. Examples of low-molecular weight polyol include: diols such as ethylene glycol, diethylene glycol, triethylene glycol, butylene glycol, 1,3-butanediol, 1,4-butanediol, neopentyl glycol, and 1,6-hexanediol; and triols such as glycerin, trimethylolpropane, and hexane triol. Examples of high-molecular weight polyol include: polyether polyol obtained by the reaction between an initiator having active hydrogen and alkylene oxide; condensed polyester polyol obtained by the dehydration and condensation between dibasic acid such as adipic acid and glycol or triol; lactone-based polyester polyol obtained by the ring-opening polymerization of lactone such as $\epsilon$-caprolactone; polycarbonate diol obtained from cyclic diol; and polymer polyol such as acrylpolyol obtained by properly introducing hydroxyl groups into acrylic copolymer. Examples of polyether polyol include polyethylene glycol, polypropylene glycol, and polytetramethylene glycol. Examples of condensed polyester polyol include polyethylene adipate. Examples of lactone-based polyester polyol include poly-$\epsilon$-caprolactone.

Among the above-described polyol, preferable is polyol having weight-average molecular weight (hereinafter, referred to as "Mw") of 50 to 2000, and more preferably 100 to 1000. The above-described polyol may be used alone or in combination of two or more of them.

Urethane polyol is polyol which has urethane bonds formed by the reaction between the above-described diisocyanate compound and polyol, and has hydroxyl groups as the terminal groups. Preferably, the urethane polyol has urethane bonds of 0.1 to 5 mmol/g with respect to 1 g of urethane polyol. The strength of the coating layer depends on the amount of urethane bond. With the amount of urethane bonds of less than 0.1 mmol/g, the concentration of the urethane in the coating layer becomes too small. Such a coating layer has poor resistance to scuffing. With the amount of urethane bonds of larger than 5 mmol/g, the coating layer has excessively high hardness. Such a coating layer does not sufficiently adapt to the deformation of the golf ball main body, and easily gets cracked/checked.

Preferably, the urethane polyol has Mw of 4000 or more, preferably 4500 to less than 10000, and more preferably 4500 to 9000. With Mw of less than 4000, long time is required for drying the coating material. In this case, the workability and productivity are lowered. With Mw of 10000 or larger, the hydroxyl value of the urethane polyol becomes relatively small. In this case, the coating material does not sufficiently react with the outside surface of the golf ball main body, and they do not sufficiently adhere to each other. The use of urethane polyol having Mw of 9000 or less forms a fine coating layer which keeps good adhesion to the golf ball main body even in a wet condition.

The hydroxyl value of urethane polyol is preferably 15 mgKOH/g to 130 mgKOH/g, and more preferably 73 mgKOH/g to 120 mgKOH/g. With the hydroxyl value of less than 15 mgKOH/g, the urethane polyol does not sufficiently react with a curing agent, and the resultant coating layer does not firmly adhere to the golf ball main body. With the hydroxyl value of larger than 130 mgKOH/g, the reaction between the urethane polyol and a curing agent becomes slow. In this case, long time is required to dry the coating material and the productivity is lowered. In addition, the resultant coating layer easily gets cracked when hit.

The urethane polyol is produced by the following steps. First, polyol as a raw material is diluted with solvent, and then is mixed with a reaction catalyst (for example, dibutyltin laurate). To the resultant, the polyisocyanate is added little by little to form urethane bonds. The urethane polyol has hydroxyl groups as terminal groups. The amount of urethane bonds is adjustable by changing the molecular weight of raw material polyol, and the mixing ratio between polyol and the polyisocyanate.

Preferably, the polyol is the urethane polyol itself. That is, preferably, the chief material is substantially the urethane polyol itself. However, the chief material may contain polyol which has no urethane bonds but is compatible with the urethane polyol.

The polyol having no urethane bonds but compatible with the urethane polyol may be selected from the polyols which are used for producing the urethane polyol such as low-molecular weight diol, triol, and polymer polyol. Specifically, the following polyols may be used: low molecular weight diol such as ethylene glycol, diethylene glycol, triethylene glycol, butylene glycol, 1,3-butane diol, 1,4-butane diol, neopentyl glycol, and 1,6-hexane diol; low molecular weight triol such as glycerin, trimethylol propane, and hexane triol; polyether polyol and condensed polyester polyol such as polyethylene glycol, polypropylene glycol, and polytetramethylene glycol; lactone-based polyester polyol; polycarbonate diol; and acryl polyol.

When the chief material contains polyol having no urethane bonds, the content of the urethane polyol in the chief material is preferably 50 weight percent or more, and more preferably 80 weight percent or more. If the chief material contains the urethane polyol of less than 50 weight percent, the obtained coating material has relatively small amount of the urethane polyol. It takes long time to dry such a coating material.

The curing agent used in the present invention is a polyisocyanate. Specifically, the curing agent is selected from aliphatic, alicyclic, aromatic, and aromatic diisocyanate compounds (i.e., aromatic diisocyanate compounds with or without isocyanate on their side chains) such as hexamethylene diisocyanate (HDI), xylylene diisocyanate (XDI), hydrogenated xylylene diisocyanate ($H_6XDI$), isophorone diisocyanate (IPDI), tetramethylxylylene diisocyanate (TMXDI), and hydrogenated diphenyl methane diisocyanate ($H_{12}MDI$). Especially preferable is a non-yellowing polyisocyanate (i.e., aliphatic or alicyclic diisocyanate compound). These polyisocyanates may be used alone or in combination of two or more of them.

If necessary, the coating material may further include additives which are generally contained in a coating material for golf ball such as a silicon-based slipping agent, a leveling agent, a viscosity regulator, a fluorescent brightening agent, a blocking inhibitor, a curing catalyst, and a color pigment. These additives are added to the chief material or the curing agent.

The chief material and the curing agent are mixed with each other into the coating material immediately before applied to the golf ball main body in such a manner that the equivalent ratio of the isocyanate groups of the curing agent with respect to the hydroxyl groups of the chief material (i.e., isocyanate groups/hydroxyl groups) is 0.5 to 2.0, and preferably 0.9 to 1.5.

As described above, the coating material is applied on the outside surface of the golf ball main body to form a coating layer. In addition to this usage, the coating material may be used as a primer coating material for the outside surface of the core, and also as a clear coating material for the surface of the core coated with a primer coating material. The coating material is applicable to a one-piece golf ball including a rubber core alone, a two-piece golf ball including a rubber core and an ionomer cover covering the core, and a thread-wound golf ball including a core, a thread material covering the core, and a cover covering the thread-wound core.

The coating method is not specifically limited, and known coating methods for two-part coating material can be employed. For example, a golf ball main body is subjected to surface treatment such as washing. Then, the chief material and the curing agent are mixed with each other to prepare the coating material. The obtained coating material is sprayed onto the outside surface of the golf ball main body by air spraying with gun or by electrostatic spraying. When the coating material is applied by an air spraying method with gun, there are the following systems to prepare the coating material. A small amount of the chief material and a small amount of the curing agent may be mixed with each other to prepare a small amount of the coating material, and this step is repeated. Or the chief material and the curing agent are continuously conveyed through their respective channels by their respective pumps to a mixer such as a static mixer provided immediately upstream of the spray gun, and they are mixed with each other at a constant ratio in the mixer. Or the chief material and the curing agent are mixed with each other at a ratio controlled by a mixing ratio controller provided to the air spraying system.

After being applied, the coating material is dried at a temperature lower than 50° C., preferably. As the coating material includes 50 weight percent or more of urethane polyol as a prepolymer, it can be dried and cured in about 0.5 to 2 hours at a temperature lower than 50° C. At the relatively low drying temperature in a short drying time like this, there is almost no adverse influence on the physical properties of the ionomer cover and the rubber core. In addition, there is almost no fear that the cover made of thermoplastic resin such as ionomer is plasticized. Therefore, the coating layer can be formed with high productivity without deteriorating the physical properties of the golf ball main body. The coating layer made of the coating material has high resistance to impact and scuffing, and keeps good adhesion to the golf ball main body in both dry and wet conditions. Coated with the coating layer, the golf ball has high resistance to impact and scuffing.

EXAMPLES

Evaluation Method

The properties of the coating layer made of the coating material was evaluated as follows (1) Adhesion a) In a dry condition The coating material was applied and dried on the outside surface of a golf ball main body. Thus-obtained golf balls were hit one hundred times, and then were visually observed to see the state of peeling and cracking/checking. The golf balls were classified into four levels in accordance with the state of peeling and cracking as follows:

⊚: no peeling and cracking/checking were observed;

○: no peeling was observed, and cracking/checking was observed in two or three portions;

Δ: peeling was observed in an area of 0.5 cm$^2$ or smaller in total, and cracking/checking was observed in three to ten portions; and X: peeling was observed in an area of 0.5 cm$^2$ or larger, and cracking/checking was observed in ten or more portions.

b) In a wet condition

The coating material was applied and dried on the outside surface of a golf ball main body. Thus-obtained golf balls were soaked in water for three days, and were hit one hundred times and then were visually observed to see the peeling state of the coating layer. In accordance with the peeling state, the golf balls were classified into four as follows:

⊚: no peeling was observed;

○: peeling was observed in an area smaller than 0.2 cm$^2$ in total;

Δ: peeling was observed in an area of 0.2 to 0.5 cm$^2$ in total; and

X: peeling was observed in an area of 0.5 cm$^2$ or larger.

(2) Drying Property

The coating material was applied and dried on the outside surface of a golf ball main body. Thus-obtained golf balls were heated at 50° C. for 1 hour in an oven, and were touched by hand. The golf balls were classified into three levels in accordance with the feeling when touched by hand as follows:

○: smooth feeling;

Δ: less smooth feeling but no fingerprints were left; and

X: fingerprints were left.

Preparation of Coating Material (1) Preparation of the Chief Material

A chief material for the coating material of Example 1 was prepared by the following steps.

Polyol shown in Table 1 was dissolved in a solvent (a mixture of toluene and methyl ethyl ketone), and then was mixed with dibutyltin laurate as a curing catalyst in an amount of 0.1 weight percent with respect to the total amount of the chief material. Thus-obtained polyol solution was heated and kept at 80° C., to which 48 weight percent of isophorone diisocyanate was added dripwise. As a result, urethane polyol (solid content: 60 weight percent) was obtained.

Repeating these steps, chief materials of Examples 2 to 7, and Comparative Examples 8 to 9 and 11 to 12. were prepared under the compositions shown in Tables 1 and 2, respectively. The chief material of Comparative Example 10 was a commercially available urethane polyol (Takerak TE5060: product of Takeda Chemical Industries, Ltd.).

Polyols used for preparing the urethane polyol were as follows: PTMG650 (polytetramethylene glycol having Mw of 650: product of Hodogaya Chemical Co., Ltd.); PTMG250 (polytetramethylene glycol having molecular weight of 250: a product of BSAF Co., Ltd.); 550U (branched polyol having Mw of 550: a product of Sumitomo Bayer Urethane Co., Ltd.); 1,2,6-hexane triol (a product of Tokyo Kasei Co., Ltd.); and trimethylol propane (a product of Koei Kagaku Co., Ltd.). The Mw and the hydroxyl value of the respective urethane polyols are shown in Tables 1 and 2.

(2) Curing Agent

Isophorone diisocyanate (a product of Sumitomo Bayer Urethane Co., Ltd.) was used.

(3) Preparation of Coating Material

The coating material of Example 1 was prepared by the following steps.

The chief material and the curing agent were put into an air gun in such a manner that the equivalent ratio of the isocyanate groups of the curing agent with respect to the hydroxyl groups of the chief material (i.e., NCO/OH) is 1.2. The mixture was stirred for one minute, and as a result, the coating material of Example 1 was obtained. Repeating these steps, the coating materials of Examples 2 to 7 and Comparative Examples of 8 to 12 were respectively prepared.

Production of Golf Ball

A: One-piece golf ball

Mixed were 100 parts by weight of high cis-polybutadiene rubber (butadiene rubber in which 96 percent thereof has cis-1,4 bond: BR-11, a product of Japan Synthetic Rubber Co., Ltd.), 26 parts by weight of zinc methacrylate, 24 parts by weight of zinc oxide, 1 part by weight of dicumyl peroxide, and 2 parts by weight of titanium oxide. The resultant was compressed and vulcanized at 160° C. for 20 minutes to form a main body of a one-piece golf ball. The golf ball had a diameter of 43 mm.

On the outside surface of the golf ball main body, the coating material of Example 1 was applied by the air gun in the state where the air gun was moved upward and downward and the golf ball main body was rotated. The coating material was applied in an amount of 150 mg. Repeating these steps, the coating materials of Example 5, and Comparative Examples 9, 10, and 11 were applied on the outside surface of the golf ball main bodies, respectively.

The adhesion and drying property of the respective coating layers were evaluated by the above-described evaluation methods. The evaluation results for Examples 1 and 5 are shown in Table 1, and the evaluation results for Comparative Examples 9, 10, and 11 are shown in Table 2.

B: Two-piece golf ball

Mixed were 100 parts by weight of high cis-polybutadiene rubber (BR-11, a product of Japan Synthetic Rubber Co., Ltd.), 25 parts by weight of zinc acrylate, 22 parts by weight of zinc oxide, and 1 part by weight of dicumyl peroxide. The resultant was compressed and vulcanized at 160° C. for 20 minutes to form a core having a diameter of 38.4 mm. On the other hand, mixed were 50 parts by weight of Himilan 1605 (sodium neutralized ethylene-methacrylic acid copolymer-based ionomer: a product of Mitsui DuPont Chemical Co., Ltd.), 50 parts by weight of Himilan 1706 (zinc neutralized ethylene-methacrylic acid copolymer-based ionomer: a product of Mitsui DuPont Chemical Co., Ltd.), and 2 parts by weight of titanium oxide to form a cover. The core was covered with the cover, and as a result, a two-piece golf ball main body having a diameter of 43 mm was obtained.

On the outside surface of the golf ball main body, the coating material of Example 2 was applied by the same manner as the one-piece golf ball. Repeating these steps, the coating materials of Examples 2, 3, 4, 6, 7 and Comparative Examples 8, 12 were applied on the outside surface of the golf ball main bodies, respectively.

The adhesion and the drying property of the respective coating layers were evaluated by the above-described evaluation methods. Table 1 shows the evaluation results for Examples 2, 3, 4, 6, 7 and Comparative Examples 8, 12.

TABLE 1

| | | | | Examples | | | | | | | | |
|---|---|---|---|---|---|---|---|---|---|---|---|---|
| No. | | | | 1 | 1 | 2 | 3 | 4 | 5 | 5 | 6 | 7 |
| Kind of golf ball | | | | A | B | B | B | B | A | B | B | B |
| Chief material (urothane polyol) | Composition | Polyol | PTMG650 | 116 | 116 | 127 | 108 | 124.8 | 136.3 | 136.3 | — | 114.6 |
| | | | PTMG250 | — | — | — | — | — | — | — | 60 | — |
| | | | 550 U | — | — | — | — | — | — | — | 54 | — |
| | | | 1,2,6-hexane triol | 16 | 16 | 9 | 22 | 5.2 | — | — | — | — |
| | | | Trimethylol propane | — | — | — | — | — | 4.7 | 4.7 | — | 15.9 |
| | | Diisocyanate | | 48 | 48 | 44 | 50 | 50 | 39 | 39 | 66 | 48.5 |
| | Property | Weight-average molecular weight | | 7992 | 7992 | 9920 | 4650 | 9950 | 6105 | 6105 | 7808 | 8900 |
| | | OH value | | 89 | 89 | 72 | 116 | 16 | 55 | 55 | 75 | 81 |
| Evaluation | Adhesion | Dry condition | | ⊙ | ⊙ | ⊙ | ⊙ | ⊙ | ⊙ | ⊙ | ⊙ | ⊙ |
| | | Wet condition | | ⊙ | ⊙ | ○ | ⊙ | ○ | ⊙ | ⊙ | ⊙ | ⊙ |
| | Drying property | | | ○ | ○ | ○ | ○ | ○ | ○ | ○ | ○ | ○ |

TABLE 2

| | | | | Comparative Examples | | | | | | | |
|---|---|---|---|---|---|---|---|---|---|---|---|
| No. | | | | 8 | 9 | 9 | 10 | 10 | 11 | 11 | 12 |
| Kind of golf ball | | | | B | A | B | A | B | A | B | B |
| Chief material (urothane polyol) | Composition | Polyol | PTMG650 | 106 | 106 | 106 | Takerak | Takerak | 135.6 | 135.6 | 127.2 |
| | | | PTMG250 | — | — | — | TE5060 | TE5060 | — | — | — |
| | | | 550 U | 18 | — | — | | | — | — | — |
| | | | 1,2,6-hexane triol | — | 25 | 25 | | | 9.4 | 9.4 | 8.8 |
| | | | Trimethylol propane | — | — | — | | | — | — | — |
| | | Diisocyanate | | 26 | 49 | 49 | | | 35 | 35 | 44 |
| | Property | Weight-average molecular weight | | 32100 | 5930 | 5930 | 19700 | 19700 | 3650 | 3650 | 10700 |
| | | OH value | | 33 | 136 | 136 | 58 | 58 | 98 | 98 | 61 |
| Evaluation | Adhesion | Dry condition | | X | ○ | ○ | ○ | ○ | ○ | ○ | ⊚ |
| | | Wet condition | | X | ○ | ○ | X | Δ | ○ | ○ | Δ |
| | Drying property | | | ○ | Δ | Δ | ○ | ○ | X | X | ○ |

Evaluation

From the results of Comparative Example 11, when the urethane polyol had too low Mw, the drying property was poor. Contrary to this, from the results of Comparative Examples 8, 10, and 12, when the urethane polyol had too high Mw, the adhesion was poor especially in a wet condition. From the results of Comparative Example 9, when the urethane polyol had too high hydroxyl value, the drying property was poor even if it had the Mw falling within the range of the present invention.

From the results of Examples 1 to 7, when the urethane polyol had Mw of 4000 to less than 10000 and a hydroxyl value of 15 to 130 mg, the adhesion and drying property were excellent. Especially, as seen from the results of Examples 1, 3, and 5 to 7, when the urethane polyol had Mw of 9000 or less, the adhesion was excellent in both dry and wet conditions.

Furthermore, from the results of Examples 1 and 5, the coating material of the present invention exhibited excellent adhesion to the rubber portion of one-piece golf ball and the cover of two-piece golf ball. Contrary to this, the coating material of Comparative Example 10 exhibited very poor adhesion to one-piece golf ball in a wet condition.

According to the present invention, a specific urethane polyol is used as a chief material. With the use of the urethane polyol, the coating material of the present invention is dryable in a short time. This is advantageous in attaining high productivity. In addition, the coating material is dryable at relatively low temperature. Therefore, when the coating material is applied and dried on the golf ball main body, there is no fear that the physical properties of the golf ball main body are adversely affected. The resultant coating layer keeps good adhesion to one-piece golf balls, two-piece golf balls, and thread-wound golf balls. In addition, the coating layer has excellent resistance to impact and scuffing in both dry and wet conditions.

Although the present invention has been fully described by way of example, it is to be understood that various changes and modifications will be apparent to those skilled in the art. Therefore, unless otherwise such changes and modifications depart from the scope of the present invention, they should be construed as being included therein.

What is claimed is:

1. A golf ball comprising:
    a main body and a coating layer on an outside surface of the main body, the coating layer comprising:
        polyol having urethane polyol as a chief material; and
        polyisocyanate as a curing agent,
            wherein an equivalent ratio of isocyanate groups of polyisocyanate with respect to hydroxyl groups of polyol (NCO/OH) is in the range of 0.5 to 2.0, and
            wherein the urethane polyol has a hydroxyl value of 55 to 130 mg KOH/g, and weight-average molecular weight of 4000 to 9000.

2. A golf ball according to claim 1 wherein the urethane polyol is produced by reacting polyol having weight-average molecular weight of 100 to 1000 and polyisocyanate.

3. A golf ball according to claim 1 wherein the polyol comprises 50 weight percent or more of the urethane polyol.

4. A golf ball according to claim 1 wherein the polyol is the urethane polyol.

5. A golf ball according to claim 1 wherein the main body is in a one-piece structure having a core including a rubber as a main component.

6. A golf ball according to claim 1 wherein the main body is in a multi-pieces structure having a core and an ionomer cover covering the core.

* * * * *